United States Patent
Katz et al.

(10) Patent No.: US 6,411,566 B1
(45) Date of Patent: Jun. 25, 2002

(54) SYSTEM AND METHOD FOR PROCESSING AN UNDERWATER ACOUSTIC SIGNAL BY IDENTIFYING NONLINEARITY IN THE UNDERWATER ACOUSTIC SIGNAL

(75) Inventors: Richard A. Katz; Azizul H. Quazi, both of East Lyme, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/912,655

(22) Filed: Jul. 25, 2001

(51) Int. Cl.⁷ ................................................. H04B 1/06
(52) U.S. Cl. ...................................... 367/135; 367/131
(58) Field of Search .............................. 367/131, 135, 367/901; 702/14

(56) References Cited

U.S. PATENT DOCUMENTS 5,781,460 A * 7/1998 Nguyen et al. ............. 367/135

OTHER PUBLICATIONS

Xinhua, Z., "Chaotic Characteristics Analyses of Underwater Acoustic Signals" Signal Processing Proceedings, 1998. ICSP '98, Oct. 1998.*

* cited by examiner

Primary Examiner—Ian J. Lobo
(74) Attorney, Agent, or Firm—Michael J. McGowan; Prithvi C. Lall; Michael F. Oglo

(57) ABSTRACT

A nonlinear signal processing system and method is used to identify nonlinearity (e.g., chaos) in underwater acoustic signals, such as sonar signals. The system and method detects the underwater acoustic signal and digitizes the underwater acoustic signal to produce an acoustic time series. The acoustic time series is reconstructed using a phase space embedding algorithm to generate a phase space embedded acoustic signal. A differential radius signal is generated from the phase space embedded acoustic signal using chaotic radius computations and differential radius computations. Thresholds can be detected in the differential radius signal to reveal nonlinear or chaotic events hidden in the underwater acoustic signal.

19 Claims, 10 Drawing Sheets

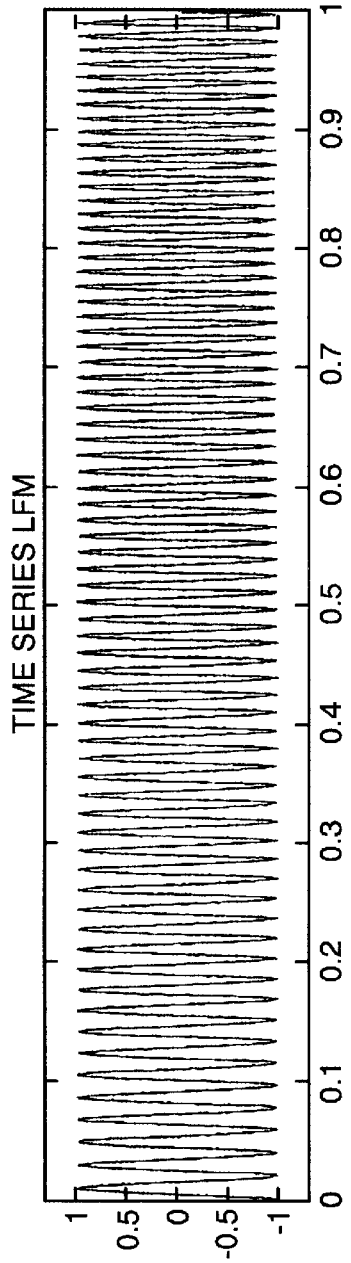
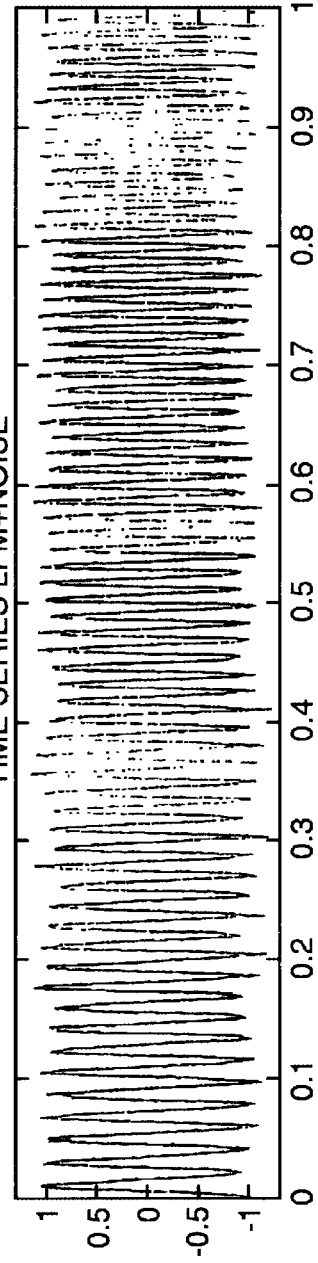
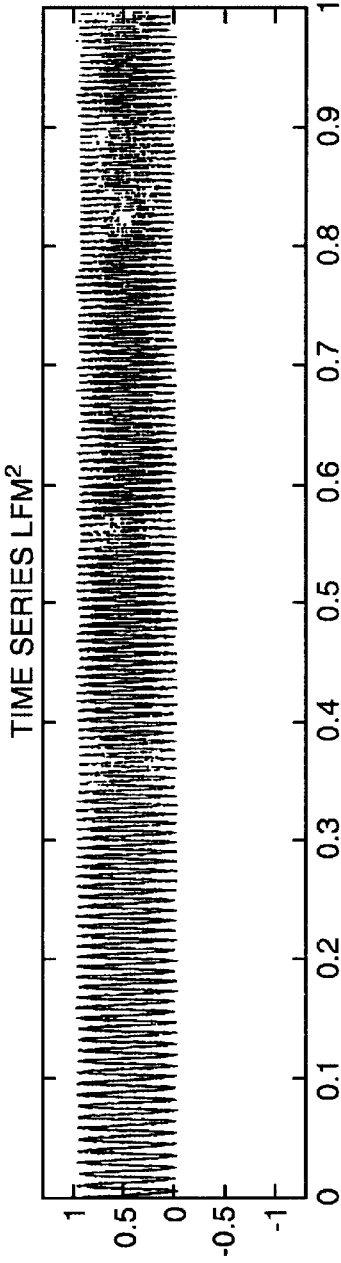
FIG. 5A
FIG. 5B
FIG. 5C

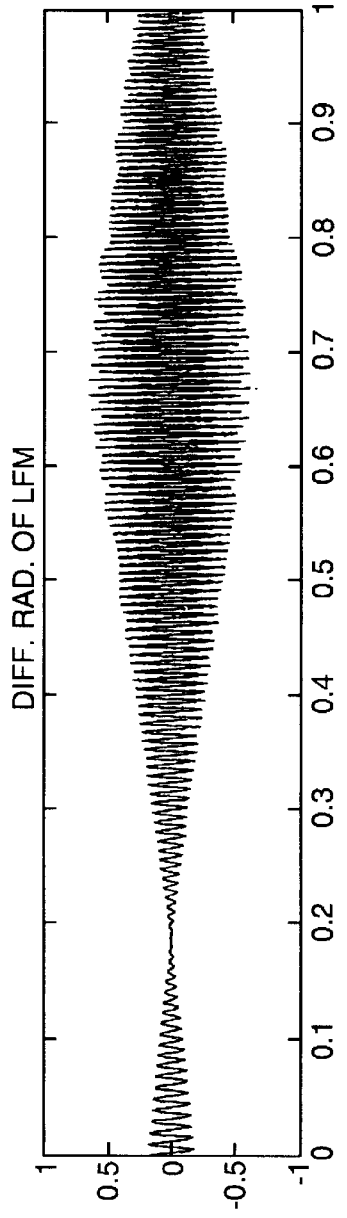
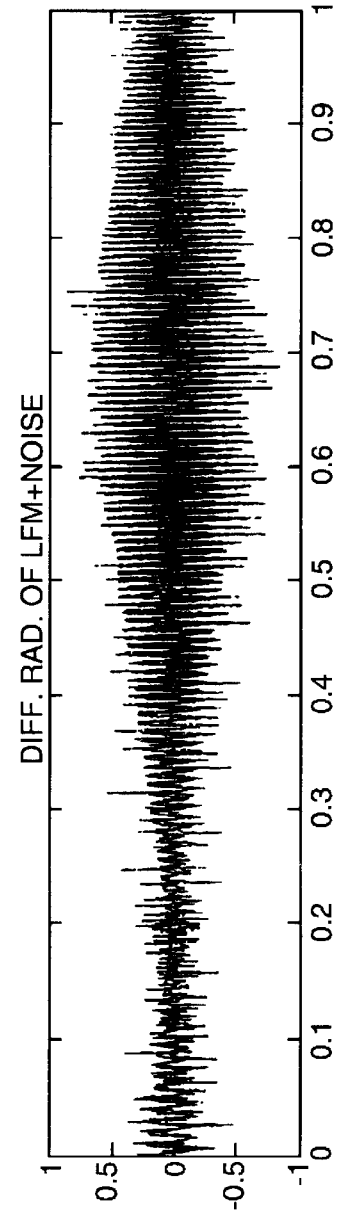
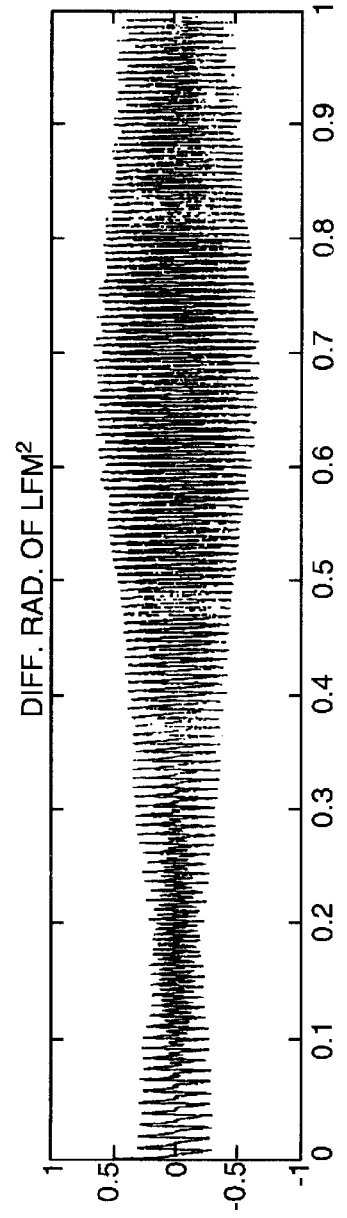
FIG. 6A
FIG. 6B
FIG. 6C

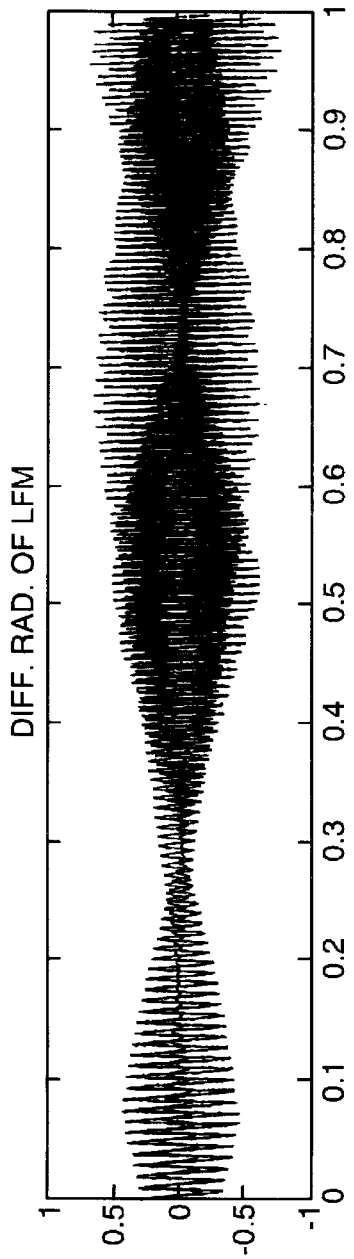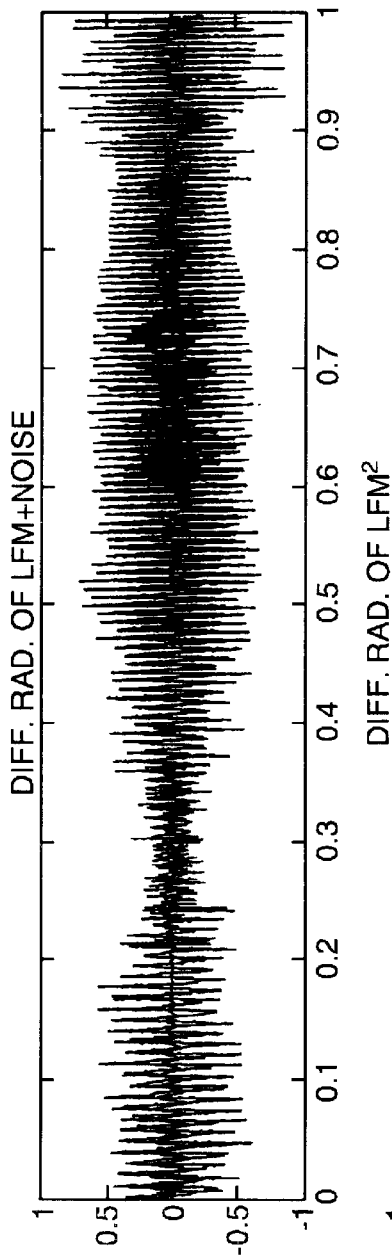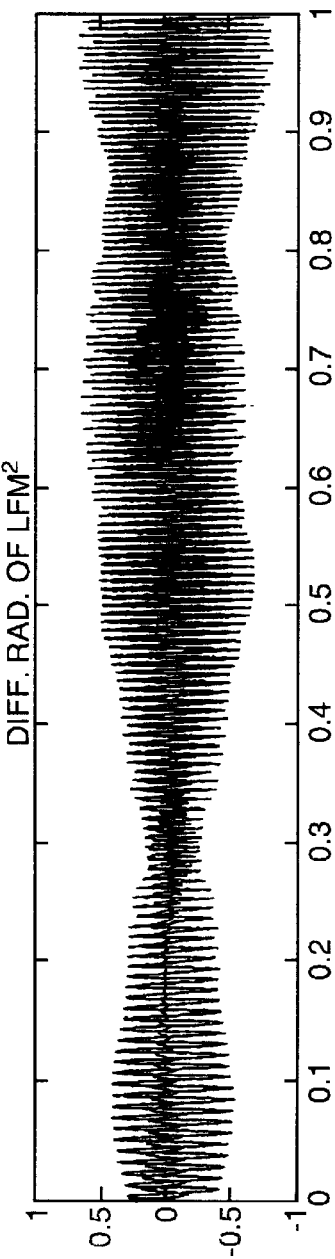

and digitizes the underwater acoustic signal to produce an acoustic time series representing the underwater acoustic signal. The acoustic time series is reconstructed using a phase space embedding algorithm to generate a phase space embedded acoustic signal. A differential radius signal is generated from the phase space embedded acoustic signal using chaotic radius computations and differential computations. Thresholds detected in the differential radius signal represent nonlinear events hidden in the underwater acoustic signal.

SYSTEM AND METHOD FOR PROCESSING AN UNDERWATER ACOUSTIC SIGNAL BY IDENTIFYING NONLINEARITY IN THE UNDERWATER ACOUSTIC SIGNAL

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED PATENT APPLICATIONS

Not applicable.

BACKGROUND OF THE INVENTION (1) Field of the Invention

The present invention relates to systems and methods for processing acoustic signals and particularly, to a system and method for processing an underwater acoustic signal by identifying nonlinearity (e.g., chaos) in the underwater signal.

(2) Description of the Prior Art

Underwater acoustic signals, such as sonar signals, have intrinsic nonlinear properties. Nonlinearity is a property of a dynamical system whereby the evolution of its variables depends on products of two or more of the present values of the variables. Chaos is a special type of nonlinearity. A defining characteristic for chaos to be present in a nonlinear system is that the system contains at least one positive lyapunov exponent. Nonlinearity in acoustics can arise from irregular (i.e., nonlinear) boundary conditions of the propagation channel, the target "echo" response, reverberant scattering within the channel, or any combinations of these.

Underwater acoustic sensors and sonar systems typically employ traditional linear processing methods. The intrinsic nonlinear properties present in underwater sound propagation and reflection cannot be detected using the traditional linear processing techniques. A linear processor can detect first order effects only. Linear processes are additive processes, i.e., the additive property of superposition applies only to linear processes. For nonlinear processes, the superposition principle no longer holds up and one must revert to some alternate means of signal analysis to best determine the information contained in the signal. Although a conventional method of signal analysis, such as a Fourier analysis, is very robust for analysis of a signal for a linear process, such methods are unable to make quantitative delineations in a signal structure whenever there exists a dominant nonlinearity in the signal of interest. Thus, the nonlinearity and chaos in the acoustic signature cannot be exploited when using conventional linear processing systems and methods.

SUMMARY OF THE INVENTION

Accordingly, one object of the present invention is to process an underwater acoustic signal by identifying nonlinearity (i.e., chaos) in the underwater acoustic signal.

In accordance with one aspect of the present invention, the system and method of the present invention detects the underwater acoustic signal and digitizes the underwater acoustic signal to produce an acoustic time series representing the underwater acoustic signal. The acoustic time series is reconstructed using a phase space embedding algorithm to generate a phase space embedded acoustic signal. A differential radius signal is generated from the phase space embedded acoustic signal using chaotic radius computations and differential computations. Thresholds detected in the differential radius signal represent nonlinear events hidden in the underwater acoustic signal.

According to one embodiment of the system and method, the phase space embedding algorithm is:

$$Y(t) = \{S(n), S(n+T), S(n+2T), \ldots S(n+(m-1)T)\}$$

where $S(n)$ represents the acoustic time series for $n=1,2,\ldots N$, $T$ is a time shift parameter, $m$ is the number of dimensions in the embedding space, and $Y(t)$ is a time dependent Euclidean vector function in $R^m$. The dimension $m$ can be determined using a False Nearest neighbor (FNN) technique. The time shift parameter $T$ can be determined by computing average mutual information (AMI) or by selective choice from a number of trial values for $T$.

In accordance with another aspect of the present invention, a nonlinear signal processor processes the acoustic time series representing the underwater acoustic signal. The nonlinear signal processor comprises a phase space embedded signal generator for reconstructing the acoustic time series using a phase space embedding algorithm to generate a phase space embedded acoustic signal. A chaotic radius processor computes a chaotic radius for each point in phase space for the phase space embedded acoustic signal producing a time series of chaotic radius values. A differential radius processor computes a time derivative of the time series of chaotic radius values to produce the differential radius signal.

BRIEF DESCRIPTION OF THE DRAWINGS

These and other features and advantages of the present invention will be better understood in view of the following description of the invention taken together with the drawings wherein:

FIGS. 5A–5C are plots of an acoustic time series for three different types of LFM signals, according to one example of the present invention;

FIGS. 6A–6C are plots of a differential radius signal for three different types of LFM signals where the embedding delay T=13, according to one example of the present invention;

FIGS. 8A–8C are plots of a differential radius signal for three different types of LFM signals where the embedding delay T=28, according to another example of the present invention.

DESCRIPTION OF THE PREFERRED EMBODIMENT

Figure 1:
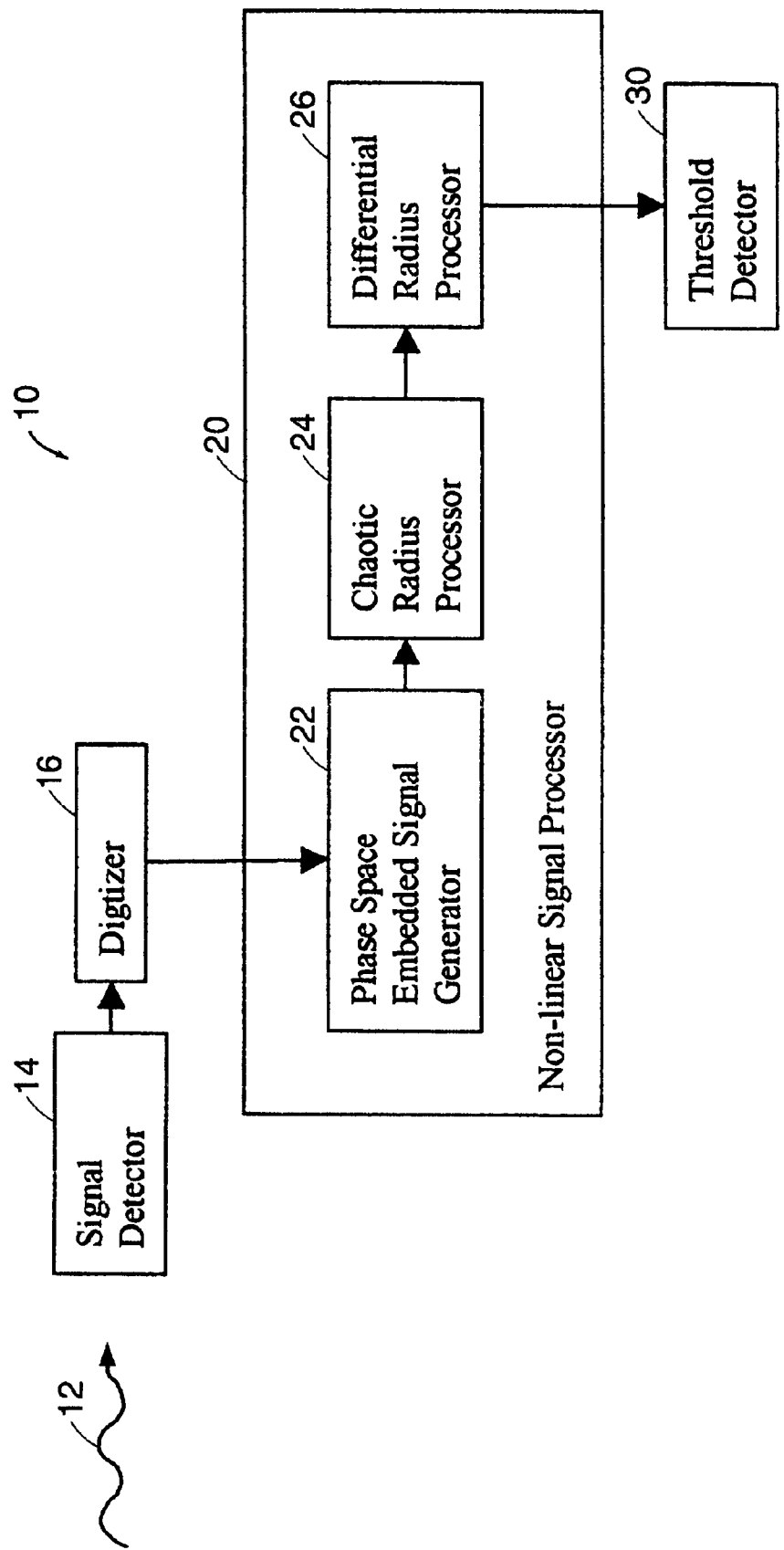
FIG. 1 is a schematic block diagram of a system for processing an underwater acoustic signal by identifying nonlinearity, according to one embodiment of the present invention.

A signal processing system 10, FIG. 1, according to the present invention, is used to process an underwater acoustic signal 12 by identifying nonlinearity such as chaos in the signal 12. The signal processing system 10 uses a nonlinear dynamical systems technique referred to as the differential radius technique for identifying the nonlinearity in the acoustic signal 12, such as a sonar signal. In the exemplary embodiment, this approach to modeling sonar signal propagation is based on a deterministic characterization of sonar dynamics. Although the exemplary embodiment is used for the detection and classification of a sonar signal, the present invention is applicable to any situation requiring detection and monitoring of underwater acoustic signals (e.g., bottom and target mapping) and applies to any underwater signal-of-interest having nonlinearity or chaos.

The signal processing system 10 includes a signal detector 14 that detects the acoustic signal 12 and converts the acoustic signal into an electronic signal. In one example, the signal detector 14 is a hydrophone or an array of hydrophones so that the time series output of the measured acoustic fluctuations represents element or beam level output. The signal processing system 10 includes a digitizer 16 that digitizes the acoustic signal (e.g., by time sampling the acoustic signal) to produce an acoustic time series. The signal processing system 10 also includes a nonlinear processor 20 that processes the digitized signal or acoustic time series using a differential radius technique for identifying nonlinearity (e.g., chaos) in the acoustic signal 12.

The nonlinear signal processor 20 comprises a phase space embedded signal generator 22, a chaotic radius processor 24, and a differential radius processor 26. These components of the nonlinear signal processor 20 can be implemented as discrete structures, as software modules in a data processing system, or as a combination of both. The nonlinear processor 20 processes the acoustic time series and generates a differential radius signal. A threshold detector 30 detects thresholds in the differential radius signal, which represent nonlinear or chaotic events hidden in the underwater acoustic signal 12.

Figure 2:
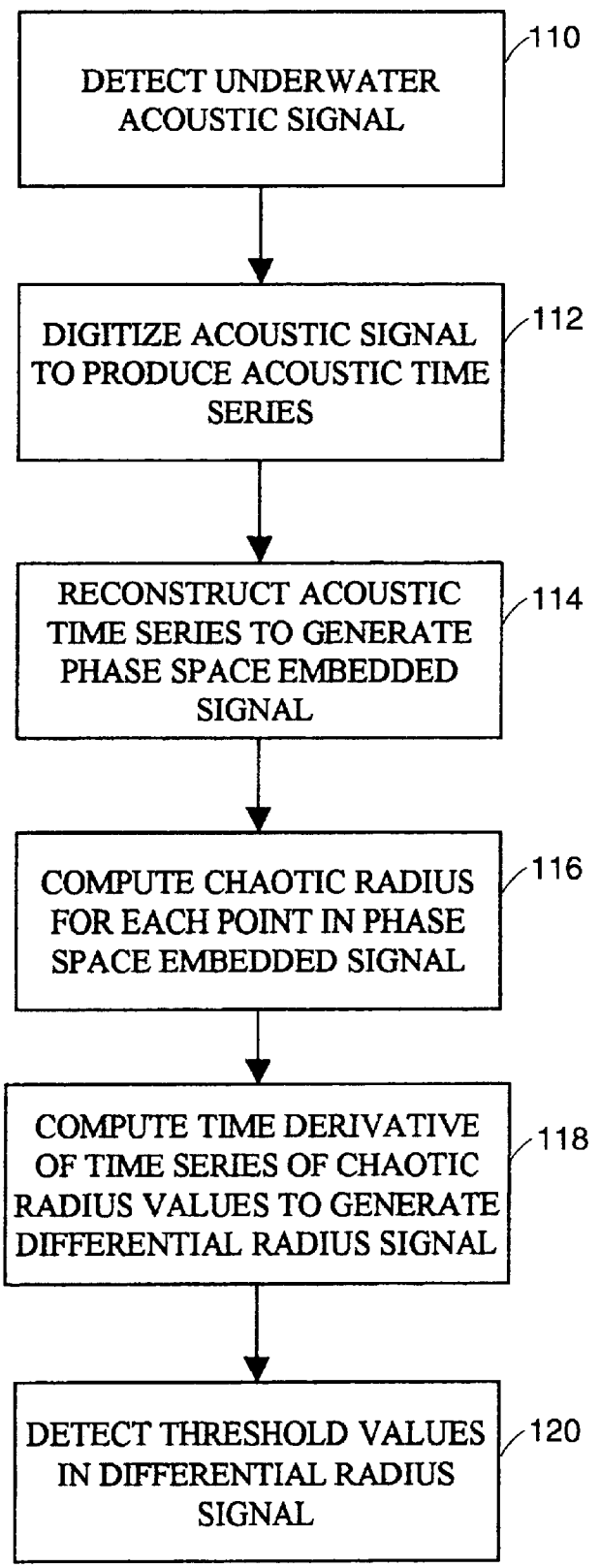
FIG. 2 is a flow chart representing the method for processing the underwater acoustic signal, according to one embodiment of the present invention.

The method for processing the underwater acoustic signal 12 is shown in FIG. 2. The underwater acoustic signal 12 is detected (step 110), and digitized to produce the acoustic time series (step 112). The acoustic time series is then reconstructed to generate a phase space embedded signal (step 114). According to one exemplary embodiment, the state space embedding algorithm can be described as follows:

$$Y(t) = \{S(n), S(n+T), S(n+2T), \ldots S(n+(m-1)T)]  \quad (1)$$

where S(n) represents the acoustic time series for n=1,2, ... N, T is a time shift parameter, m is the number of dimensions in the embedding space, and Y(t) is a time dependent Euclidean vector function in $R^m$. Each added delay (e.g., T, 2T, 3T, etc.) can be thought of as a derivative of higher order. For a 2-D system, the first derivative is captured, for a 3-D system, a second derivative is captured, and so on until all of the derivatives necessary for some prescribed nth order differential system are obtained.

One method of determining the dimension m is by applying a numerical technique called False Nearest Neighbors (FNN). One preferred method of determining an optimal delay or time shift parameter T is by computing the average mutual information (AMI). According to another alternative, the parameter T is computed using a value obtained by choosing from a number of trial selections that maximally fill out orbits in the phase space domain. The selection of an appropriate time delay value T is described in greater detail below.

The chaotic radius for each point in the phase space embedded signal is then computed, step 116. The chaotic radius is defined as the Euclidean distance from the point of origin in is defined as the Euclidean distance from the point of origin in phase space to any given point along the phase space orbit. In two dimensions, the chaotic radius is obtained by computing the hypotenuse using the Pythagorean Theorem, in which values for the legs of the triangle are given by the x and y vector components of the point in phase space. According to one example, a vector is drawn from the origin to a point in the Euclidean phase space, and the vector magnitude is the chaotic radius. Vectors are constructed from the origin to each succeeding point in phase space, and the magnitude of each successive vector yields a time sequence of chaotic radius values that replaces the original acoustic time series.

The differential radius signal is then generated by computing the time derivative of the chaotic radius values (step 118). The differential radius is computed from the time sequence of chaotic radius values by computing the time derivative, or rate at which points separate in phase space. In one example, the differential radius can be approximated by taking the difference of magnitude between adjacent points in the time sequence of chaotic radius values.

Threshold values in the differential radius signal can be detected (step 120) to allow nonlinear or chaotic events to be identified. The differential radius signal indicates where significant "jumps" occur in phase space and thus can be used to monitor and track the entropy of an evolving dynamical system. Because the differential radius, when plotted as a function of time, is a measure of the separation rate of neighboring points in phase space, it is also related to the Lyapunov exponent (the characteristic parameter that is used to define chaos), and thereby, to the entropy as well. The differential radius signal provides an indication of events in which the state of the system changes rapidly with respect to itself, such as when the transmitted signal "echoes" off of a target (e.g., in time and space).

Thus, the chaotic radius and differential radius computations provide highly precise temporal and spatial detection markers for evolving events as the time series unfolds. Hidden or anomalous events can therefore be detected in an acoustic time series. These events are associated with rapidly changing evolutions in phase space, typical for a variety of nonlinear and chaotic motions exhibited in a large number of acoustic signatures. Target echo responses, man-made and biologic anomalies in an otherwise ambient acoustic background are examples of such evolutions.

The present invention is now described in greater detail in connection with a simulated sonar signal X(t), a linear frequency modulated (LFM) wave form given by the following expression:

$$X(t) = A \sin[2\pi(f_0 t + \alpha t^2)] + n(t) \quad (2)$$

where A is the amplitude level, $f_0$ is the start frequency, $\alpha$ is the change in frequency per second, t is the time duration, and n(t) is additive noise. In this example, assume that the amplitude A is 1, the start frequency $f_0$ is 50 hertz, (Hz), the end frequency is 90 Hz, $\alpha$=20 Hz per second, the time duration t is 1 second, and the sampling interval $\Delta t$ is 1 millisecond.

FIGS. 3A–3D show how this LFM signal looks in phase space in two dimensions for four different values of the delay parameter T in the pure signal case having 0% additive noise or n(t)=0. In the example shown, the abscissa is X(t) and the ordinate is X(t+T) for values of T=1 (FIG. 3A), T=3

(FIG. 3B), T=10 (FIG. 3C) and T=13 (FIG. 3 D). Although the topology is similar at each value of the delay, T, the intricacy of the LFM signal is best revealed at a delay of T=13 sampling points (FIG. 3D). This LFM signal exhibits an almost-limit cycle behavior as in a simple sine or co-sine function, but unlike a sine wave, the LFM signal is made of several almost-connected sine waves. A limit cycle is an orbit that comes back on itself. If the LFM signal were to propagate in time over and over again continually, one would observe a repetition of combined frequency singular limit cycle orbit for each repeated cycle when plotted in phase space. This LFM signal having 0% additive noise is dynamically linear in that there are no apparent perturbations that force the LFM signal away from its natural orbit.

Figure 4A:
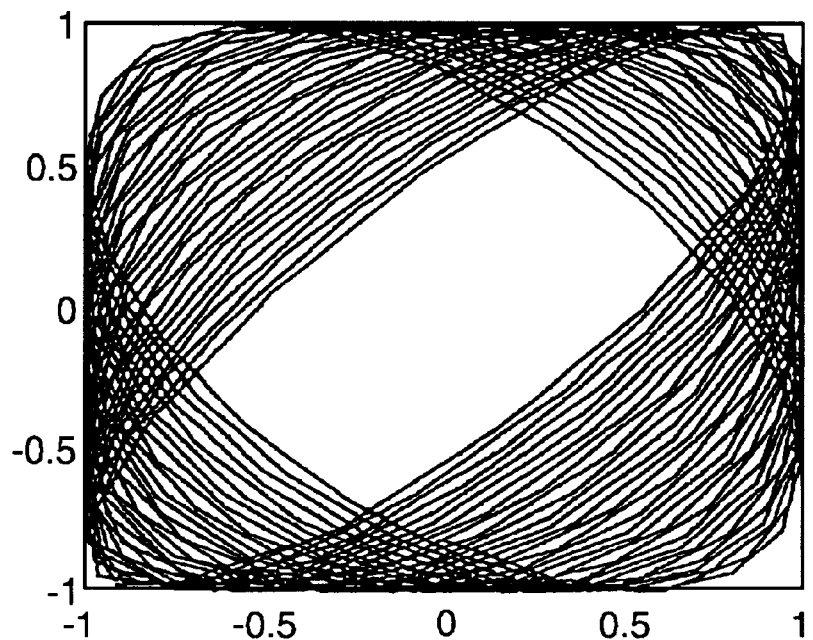
FIGS. 4A–4D are plots of phase space orbits of a LFM signal having different signal-to-noise ratios, according to one example of the present invention.
Figure 4B:
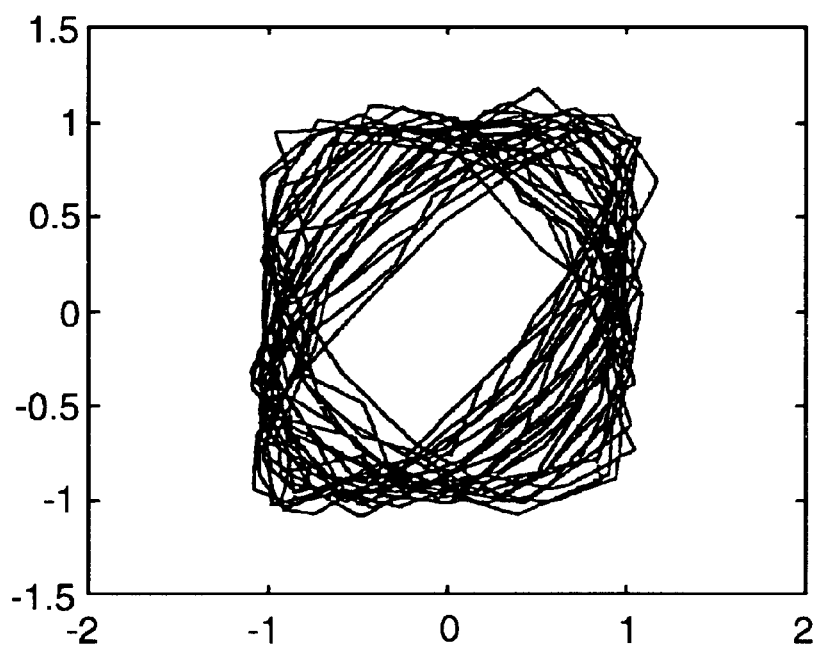
Figure 4C:
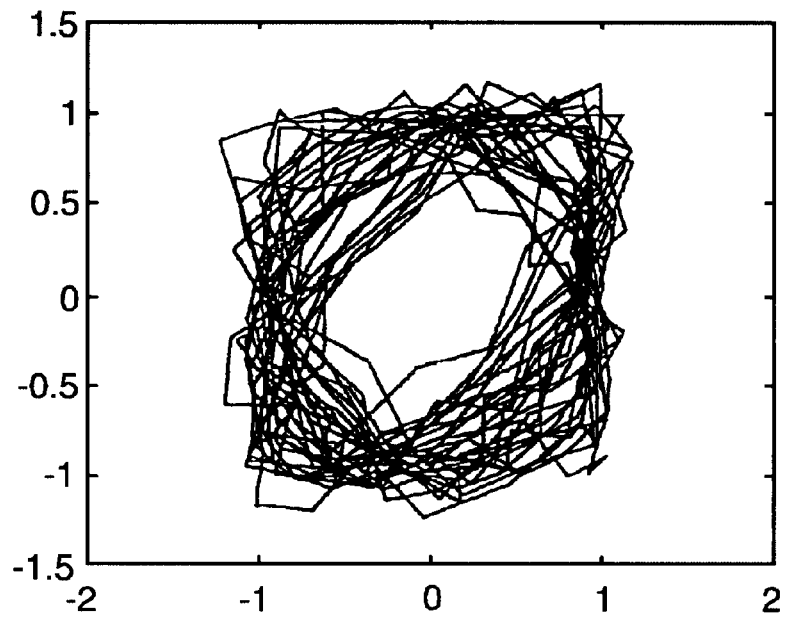
Figure 4D:
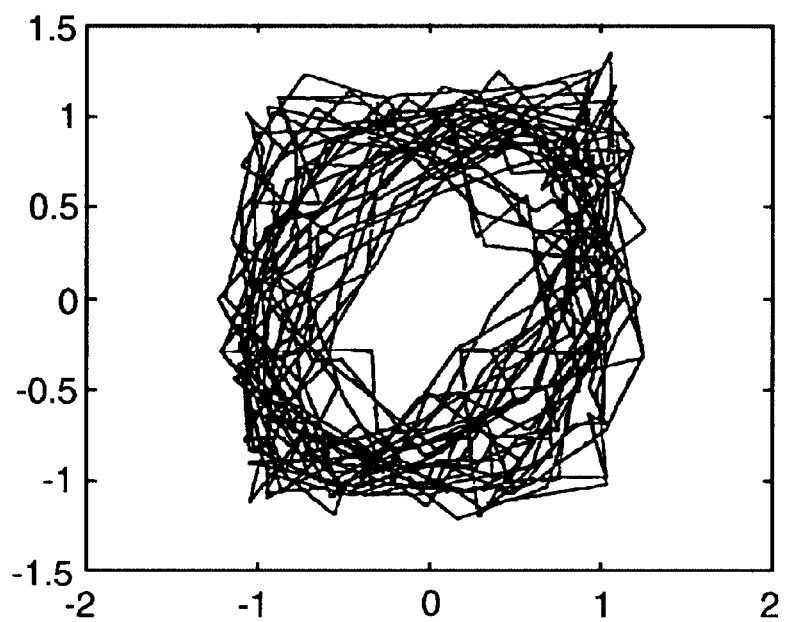

FIGS. 4A–4D show the phase space orbits of the LFM signal at different signal-to-noise ratios (SNR's): SNR=☐ (FIG. 4A); SNR=20 dB (FIG. 4B); SNR=17 dB (FIG. 4C); and SNR=14 dB (FIG. 4D). When noise is added to this signal, the phase space images become more diffuse. At an SNR of 14 (FIG. 4D), for example, the intricate helical pattern is totally obscured, yet very rough near-limit cycle behavior can be observed. As more noise is added to the LFM signal, the almost-limit cycle appearance of the LFM signal eventually becomes unrecognizable.

FIGS. 5A–5C shows the time series for three simulated conditions: (1) the pure LFM signal (FIG. 5A); (2) the LFM signal plus 10% additive noise (FIG. 5B); and (3) a full wave square law rectification of the pure LFM signal (FIG. 5C). Condition (3) is a nonlinear analog of condition (1) due to the squaring operation. By discriminating between a linear and non-linear time evolution, the differential radius technique discussed above is able to identify the nonlinearity in condition (3).

The time series plots can be interpreted analytically through trigonometric relationships as well as dynamically through corresponding phase plots and differential radius plots. Analytically, a trigonometric relationship exists between the pure LFM signal (FIG. 5A) and the squaring of the same LFM signal (FIG. 5C). Since the LFM signal is represented analytically by a sine function, as indicated above in Equation (2), the relationship between the two signals is made clear by the following identity:

$$\sin^2(\omega(t)) = \tfrac{1}{2} - \tfrac{1}{2} \cos(2\omega(t)) \tag{3}$$

This sine-squared signal is the superposition of two signals, one a 0 Hz or "flat line" signal with constant amplitude equaling ½, and the other, a cosine or phase-shifted sine wave of twice the frequency ω and one-half the amplitude. Multiplying two sine waves of different frequencies together is equivalent to superposing two signals of differing frequencies in which both superposed frequencies are non-zero.

The time series of the LFM signal plus additive noise (FIG. 5B) represents a small perturbation (i.e., 10% added noise) to the pure LFM signal and looks almost the same. The dynamical sensitivity to 10% additive noise can be seen by comparing the phase space orbits for the pure LFM signal (FIG. 4A) and the LFM signal with 10% added noise (FIG. 4B).

FIGS. 6A–6C show the differential radius signals for the three times series across a one second window and with a time delay T=13. Where the time delay T=13, the differential radius of the pure LFM signal has a region where the differential radius is very close to zero from time t=0.18 to t=0.20. During this portion of the temporal evolution of the LFM signal, the dynamical signal trajectory in phase space resides on a circle of radius of approximately equal to one.

Figure 3A:
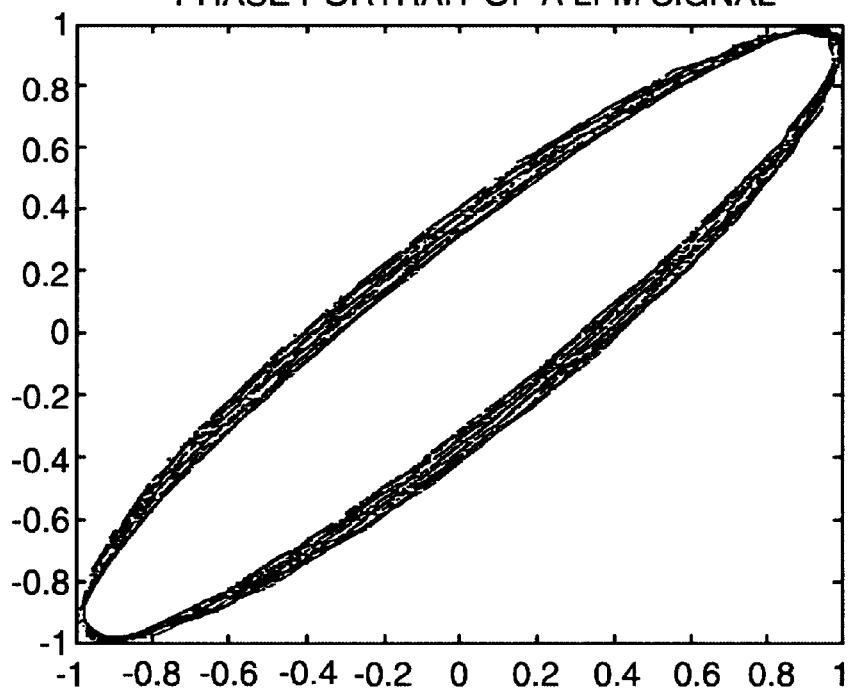
FIGS. 3A–3D are plots of phase space orbits of a linear frequency modulated (LFM) signal having different embedding delays T, according to one example of the present invention.
Figure 3B:
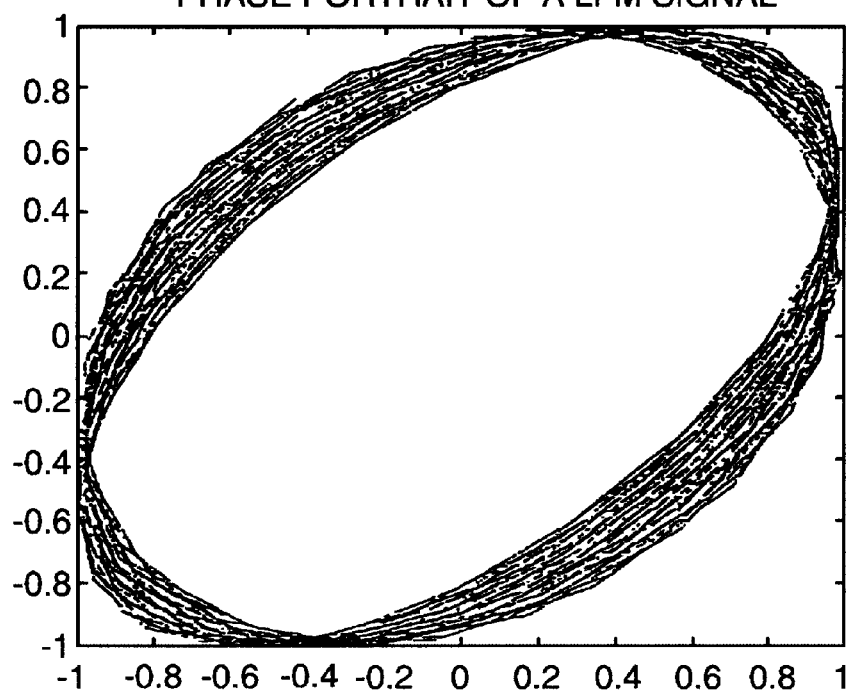
Figure 3C:
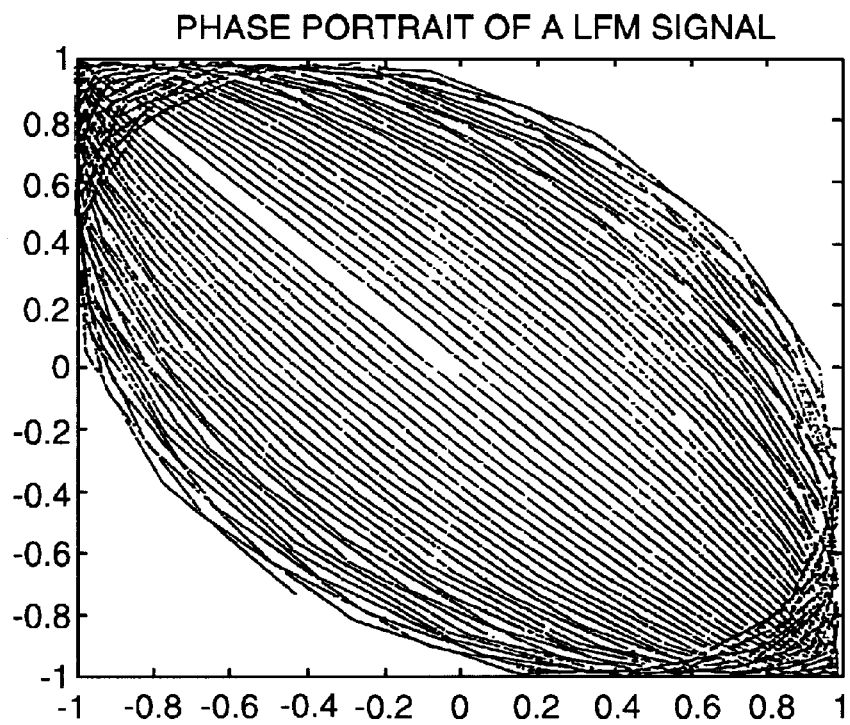
Figure 3D:
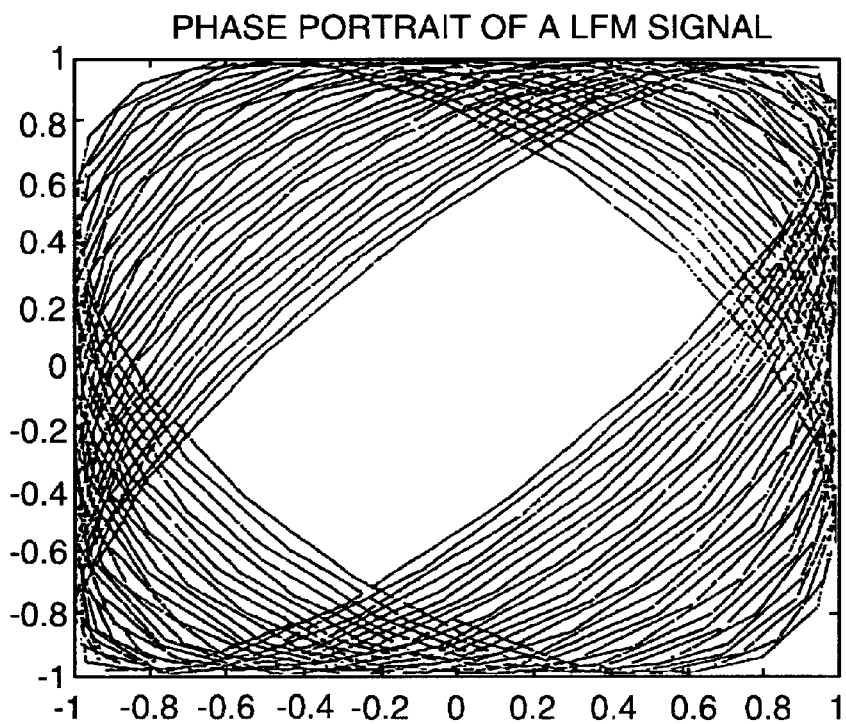
Figure 7:
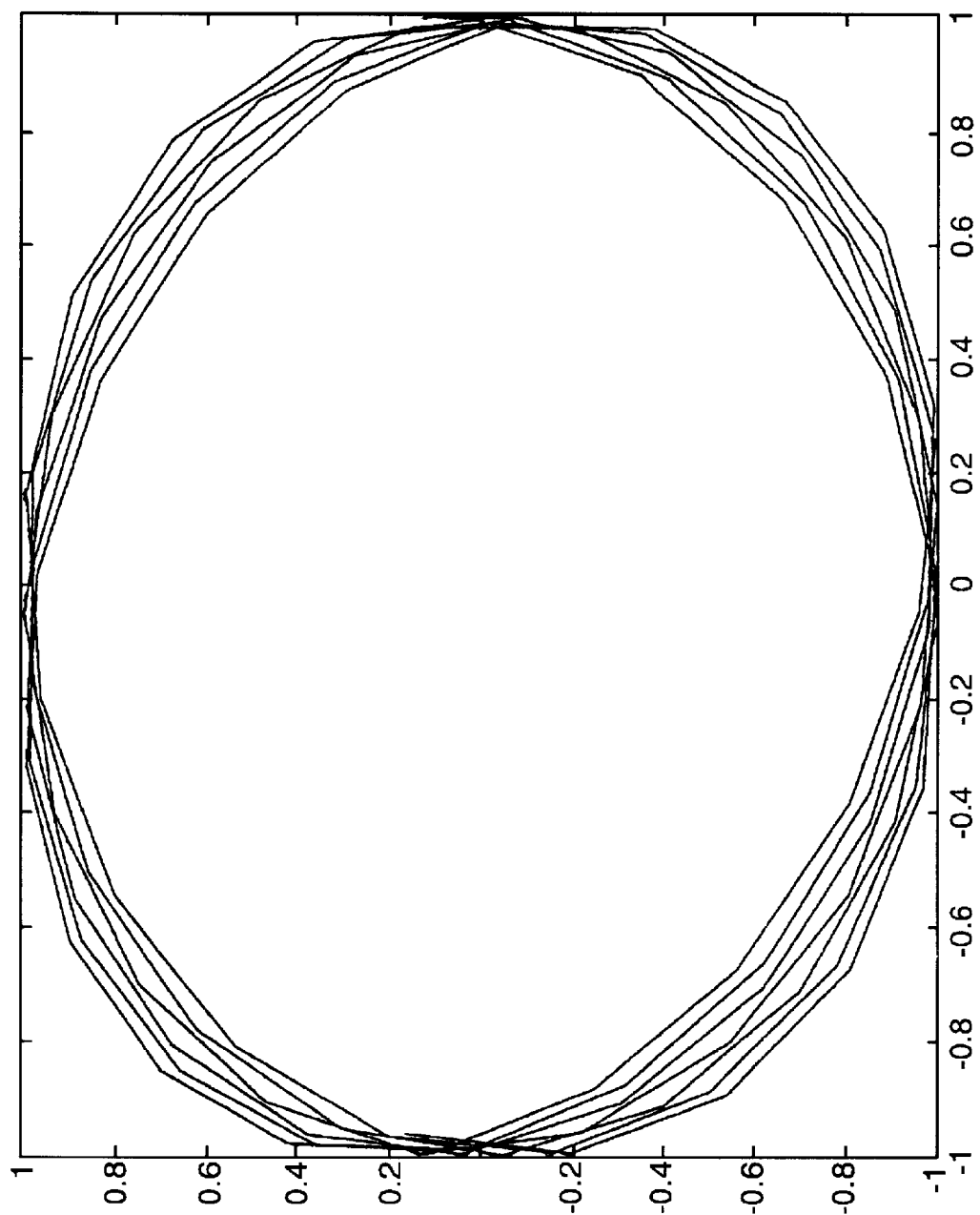
FIG. 7 is a phase plot of a LFM signal at time t=0.2s and having a delay T=13, according to one example of the present invention.

FIG. 7 shows a phase plot of the simulated LFM signal taken around the interval 0.18<t<0.2 at a delay of T=13, which is hidden in the more complicated phase plot shown in FIG. 3D. This phase plot represents a typical circular (near-limit cycle) pattern in which T=13 represents ¼ wavelength for a frequency of about 57 Hz, which is the same frequency being "swept out" by the LFM signal in the time interval 0.18<t<0.2.

As the LFM signal evolves over time, there is a continual shift in its frequency. The starting frequency of the simulated signal is 50 Hz, and at 0.19 seconds from the starting time, the frequency has advanced to 57 Hz. The chosen delay of T=13 corresponds to a time interval approximately equal to λ/4, where λ is the associated period of the LFM 57 Hz frequency component. Choosing a different delay T would require a corresponding shift in frequency to obtain a circular geometry of the orbit. For a delay of T=13 (FIG. 6A), the differential radius of the pure LFM signal converges while in oscillation to zero around t=0.2 seconds and thereafter diverges while still in oscillation to a maximum around t=0.7 beyond which it again begins to converge back to zero. In the differential radius of the LFM signal with 10% additive noise (FIG. 6B), the trends in differential radius fluctuation are very similar, but several deflections are evident above and below the pattern for the pure LFM signal. Thus there is an appearance of a higher degree of randomness in the case of the noisy signal as compared to the pure signal. This apparent increase in random behavior can be associated with a corresponding increase in entropy between the two signals.

The differential radius of the full wave square law rectified signal (FIG. 6C) has approximately the same maximum in comparison to the pure LFM signal (FIG. 6A) but exhibits differences when comparing the minima. The differential radius of the squared LFM signal has no zero convergence. The squaring operation has pushed the limit cycle at 57 Hz away from the origin to the extent that it no longer maintains, at least for the short duration, a constant radius (i.e., a near perfect circular geometry centered at the origin). Thus, the dynamical distinction in differential radius between the pure LFM signal and the squared LFM signal shows that the differential radius is a useful analytical tool for identifying and discriminating nonlinearities in a measured time sequence.

The implications of the choice of the delay T on the dynamical evolution of the differential radius can be seen by examining the corresponding limit cycle frequency component of the LFM signal for a prescribed delay value T. For a given value of T, the limit cycle period λ is related to T by the following expression:

$$\lambda/4 + n\lambda/2 = T \tag{4}$$

This expression shows that a circular limit cycle exists in a phase space orbit if the embedding delay T is chosen to be ¼ of the period of oscillatory wave plus any integer multiple 180 degree translation of the period. For example, a delay value of T=13 corresponds to λ=52 msec or f=19 Hz for n=0. Since 19 Hz lies outside of the band of the simulated LFM signal, an integer multiple 180 degree translation must be identified that first appears inside the band, according to equation (4). Where the band of the signal described above goes from 50 to 90 Hz, the integer value n that satisfies this requirement is n=1. Solving for f=1/λ where λ is obtained by solving the above equation (4), one obtains f=57 Hz. Therefore, the 57 Hz component of the LFM signal will have a differential radius value equaling zero whenever the specified embedding delay T equals 13 sample units.

FIGS. 8A–8C show the differential radius signals for the three times series with a time delay of T=28. According to equation (4), when the delay T equals 28, $\lambda$=112 msec and f=9 Hz for n=0. Because 9 Hz lies outside the LFM band of 50 to 90 Hz, one must choose an appropriate value for n. For example, a value of n=3 yields f=62 Hz and a value of n=4 yields f=81 Hz, which correspond identically to the null points in the differential radius plot of the pure LFM signal (FIG. 8A) at 0.3 seconds and 0.75 seconds, respectively.

Although the examples described above use the values of 13 and 28 for the delay T, there are many selections of the delay T for which the differential radius will equate to zero, and the number of choices grows as the signal bandwidth grows. Although the selection of the delay T is described above in reference to the pure LFM signal, this applies also to the LFM signal with noise and the squared LFM signal. An appropriate value for the delay T should be selected to best quantify the dynamics underlying the evolution of a particular signal of interest. For the case of a periodic or chaotic signals, the first minimum of the average mutual information (AMI) is one of the preferred methods for selecting the delay value T.

Accordingly, the nonlinear signal processing system and method of the present invention is used in data processing of active sonar signals for enhanced detection and classification and identification of nonlinearity in the signal structure. The enhancement techniques, namely the chaotic and differential radius, when operated on an original acoustic time series measurement, provide precise, temporal and spatial detection markers for evolving events as the time series unfolds. This allows the detection of hidden or anomalous events in an acoustic time series, associated with rapidly changing evolutions in phase space, typical for a variety of nonlinear and chaotic motions exhibited in a large number of acoustic signatures.

In light of the above, it is therefore understood that within the scope of the appended claims, the invention may be practiced otherwise than as specifically described.

What is claimed is:

1. A method for processing an underwater acoustic signal by identifying nonlinearity in said underwater acoustic signal, said method comprising:

detecting said underwater acoustic signal;

digitizing said underwater acoustic signal to produce an acoustic time series representing said underwater acoustic signal;

reconstructing said acoustic time series using a phase-space embedding algorithm to generate a phase space embedded acoustic signal;

generating a differential radius signal from said phase space embedded acoustic signal using chaotic radius computations and differential radius computations; and detecting thresholds in said differential radius signal, wherein said thresholds represent nonlinear events hidden in said underwater acoustic signal.

2. The method of claim 1 wherein said acoustic signal is a sonar signal.

3. The method of claim 1 wherein said phase-space embedding algorithm is $Y(t)=\{S(n),S(n+T), S(n+2T), \ldots S(n+(m-1)T)\}$ where S(n) represents said acoustic time series for n=1,2, ... N, T is a time shift parameter, m is the number of dimensions in the embedding space, and Y(t) is a time dependent Euclidean vector function in $R^m$.

4. The method of claim 3 further comprising determining said dimension m using a False Nearest Neighbor (FNN) technique.

5. The method of claim 3 further comprising determining said time shift parameter T by computing average mutual information (AMI).

6. The method of claim 3 further comprising determining said time shift parameter T by appropriate selection obtained from a number of trial values, in which the phase space orbit is spatially maximized.

7. The method of claim 1 wherein generating said differential radius signal comprises:

computing a chaotic radius for each point in phase space for said phase space embedded acoustic signal producing a time series of chaotic radius values; and computing a time derivative of said time series of chaotic radius values to produce said differential radius signal.

8. The method of claim 2 further including using said nonlinear events to detect and classify said sonar signal.

9. The method of claim 1 wherein said nonlinear events include chaos events.

10. A system for processing an underwater acoustic signal by identifying nonlinearity in said underwater acoustic signal, said system comprising:

means for detecting said underwater acoustic signal;

means for digitizing said underwater acoustic signal to produce an acoustic time series representing said underwater acoustic signal;

means for reconstructing said acoustic time series using a phase-space embedding algorithm to generate a phase space acoustic signal;

means for generating a differential radius signal from said phase space acoustic signal using chaotic radius computations and differential radius computations; and means for detecting thresholds in said differential radius signal, wherein said thresholds represent nonlinear events hidden in said underwater acoustic signal.

11. The system of claim 10 wherein said phase-space embedding algorithm is $Y(t)=\{S(n),S(n+T), S(n+2T), \ldots S(n+(m-1)T)\}$ where S(n) represents said acoustic time series for n=1,2, ... N, T is a time shift parameter, m is the number of dimensions in the embedding space, and Y(t) is a time dependent Euclidean vector function in $R^m$.

12. The system of claim 10 wherein said means for generating said differential radius signal comprises:

means for computing a chaotic radius for each point in phase space for said phase space embedded acoustic signal producing a time series of chaotic radius values; and means for computing a time derivative of said time series of chaotic radius values to produce said differential radius signal.

13. The system of claim 10 wherein said underwater acoustic signal is a sonar signal, and further comprising means for detecting and classifying said sonar signal based on said nonlinear events detected in said differential radius signal.

14. The system of claim 11 further comprising means for determining said time shift parameter T by computing average mutual information (AMI).

15. A nonlinear signal processor for processing an acoustic time series representing an underwater acoustic signal, said nonlinear signal processor comprising:

a phase space embedded signal generator for reconstructing said acoustic time series using a phase space embedding algorithm to generate a phase space embedded acoustic signal;

a chaotic radius processor for computing a chaotic radius for each point in phase space for said phase space embedded acoustic signal producing a time series of chaotic radius values; and a differential radius processor for computing a time derivative of said time series of chaotic radius values to produce said differential radius signal, wherein said differential radius signal provides an indication of nonlinear events present in said underwater acoustic signal.

16. The nonlinear signal processor of claim 15 wherein said phase-space embedding algorithm is Y(t)={S(n),S(n+T), S(n+2T), . . . S(n+(m−1)T)} where S(n) represents said acoustic time series for n=1,2, . . . N, T is a time shift parameter, m is the number of dimensions in the embedding space, and Y(t) is a time dependent Euclidean vector function in $R^m$.

17. The nonlinear signal processor of claim 16 wherein said phase space embedded signal generator determines said dimension m using a False Nearest Neighbor (FNN) technique.

18. The nonlinear signal processor of claim 16 wherein said phase space embedded signal generator determines said time shift parameter T by computing average mutual information (AMI).

19. The nonlinear signal processor of claim 16 wherein said phase space embedded signal generator determines said time shift parameter T by computing a value associated with the filling out of the dynamical orbit in the phase space domain.

* * * * *